(12) United States Patent
Kato et al.

(10) Patent No.: US 7,147,349 B2
(45) Date of Patent: Dec. 12, 2006

(54) LIGHT SOURCE AND PROJECTOR

(75) Inventors: Hisamaro Kato, Matsumoto (JP); Gaku Nishizawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 157 days.

(21) Appl. No.: 10/782,844

(22) Filed: Feb. 23, 2004

(65) Prior Publication Data

US 2004/0228130 A1    Nov. 18, 2004

(30) Foreign Application Priority Data

Feb. 25, 2003    (JP)    ............................. 2003-047760

(51) Int. Cl.
*F21V 29/00*    (2006.01)

(52) U.S. Cl. ................. 362/294; 362/264; 362/373

(58) Field of Classification Search ............... 362/261, 362/263, 294, 345; 313/11
See application file for complete search history.

(56) References Cited

U.S. PATENT DOCUMENTS

| | | | |
|---|---|---|---|
| 3,701,895 A * | 10/1972 | Sweetser | 362/264 |
| 6,364,492 B1 * | 4/2002 | Fujimori et al. | 353/119 |
| 6,398,366 B1 * | 6/2002 | Hara et al. | 353/57 |
| 6,402,346 B1 * | 6/2002 | Liao et al. | 362/294 |
| 6,435,699 B1 * | 8/2002 | Glowach et al. | 362/294 |
| 6,481,854 B1 * | 11/2002 | Sugawara et al. | 353/52 |
| 6,509,674 B1 * | 1/2003 | Nakagawa | 313/113 |
| 6,709,115 B1 * | 3/2004 | Chimura et al. | 353/119 |
| 6,759,793 B1 * | 7/2004 | Narita | 313/13 |
| 6,837,583 B1 * | 1/2005 | Gishi et al. | 353/57 |
| 6,966,654 B1 * | 11/2005 | Ozawa et al. | 353/61 |
| 2002/0159273 A1 * | 10/2002 | Erion | 362/547 |
| 2004/0207306 A1 * | 10/2004 | Horiuchi et al. | 313/113 |

FOREIGN PATENT DOCUMENTS

| | | |
|---|---|---|
| JP | A 8-304739 | 11/1996 |
| JP | A 11-237691 | 8/1999 |
| JP | A 11-329015 | 11/1999 |
| JP | A 2001-183746 | 7/2001 |
| JP | A 2001-256819 | 9/2001 |
| JP | 2001330890 A * | 11/2001 |
| JP | A 2002-107823 | 4/2002 |
| JP | A 2002-350976 | 12/2002 |
| JP | A 2003-005292 | 1/2003 |

* cited by examiner

*Primary Examiner*—Ali Alavi
*Assistant Examiner*—Hargobind S. Sawhney
(74) *Attorney, Agent, or Firm*—Oliff & Berridge, PLC

(57) ABSTRACT

A light source device (40) attached to an optical equipment provided with a light-source cooling fan (3) has a light source (401), a reflector (402), a light-transmissive component (51) that closes the light-irradiation side of the reflector (402) and a light source housing (50) that houses the above components. An opening (402A) for introducing a cooling air is formed on the reflector (402) and an opening (52) is formed on the light source housing (50) at a position corresponding to the light source housing (50). A duct (53) of which light-irradiation side is opened is provided on the opening (52). When the light source device (40) is attached to the optical equipment, the duct (53) protrudes toward the light-irradiation side to be connected with the fan (3). The opening (52) is opened in accordance therewith, so that the air from the fan (3) is introduced into the reflector (402).

10 Claims, 9 Drawing Sheets

LIGHT SOURCE AND PROJECTOR

BACKGROUND OF THE INVENTION

1. Field of the Invention

The present invention relates to a light source device. More specifically, the present invention relates to a light source device used in an optical equipment such as a projector using a light beam irradiated by a light source, the light source device capable of efficiently cooling a light source lamp housed therein by introducing an air from a fan provided on the optical equipment.

2. Description of Related Art

Conventionally, projectors have been used for presentation at conferences, academic societies, exhibitions, movie-viewing at home and the like. Such projectors modulate a light beam irradiated by a light source provided inside an exterior case in accordance with image information to form an optical image and projects the optical image in an enlarged manner. In recent projectors, in order to clearly display the projected optical image, it is required to increase the illuminance of light source lamps.

High-pressure mercury lamps, metal halide lamps and the like are used as the light source lamp of such projectors, which are consumable supplies and are required to be exchanged while using optical equipments such as projectors using the lamps. Further, light-emitting tube made of quartz glass etc. may be exploded according to life span of the lamps and broken pieces thereof may be scattered inside the projector. Furthermore, since a great amount of heat is generated by the light source lamp in accordance with the increase in the luminance thereof, in order to prevent the explosion of the light source lamp, the generated heat has to be radiated to the outside to cool the lamp.

In light of the above, following mechanism is provided in a conventional light source device having a light source lamp (see Japanese Patent Laid-Open Publication No. 2002-107823, for instance). A light-irradiation side of a reflector is covered with a transparent plate made of glass etc. and a plurality of air vents as intake and exhaust ports are formed on a part of the reflector or the transparent plate. Lid components (shutter components) are provided on the respective air vents so that the respective lid components open the air vents when the light source device is attached to the projector and close the corresponding air vents when the light source device is detached from the projector. According to the above arrangement, the light source lamp can be cooled and the broken pieces are not scattered around when the lamp is exploded, where the light source lamp can be exchanged together with the light source device.

However, according to the above arrangement where the air vents are closed by the lid components, since a space for opening and closing the lids have to be secured, a discharge hole of a lamp-cooling fan inside the projector cannot be directly connected with the opening, so that a part of the air outflowed from the discharge hole of the fan is leaked to the other section and the cooling ability of the fan cannot be fully exerted.

SUMMARY OF THE INVENTION

An object of the present invention is to provide a light source device capable of preventing the broken pieces of a light source lamp from scattering when the light source lamp is damaged and capable of efficiently introducing the air for cooling the light source lamp toward the inside thereof, and a projector using the light source device.

A light source device according to an aspect of the present invention is attached to an optical equipment provided with a light-source cooling fan thereinside, the light source including: a light source; a reflector that has a concave curved reflection surface and houses the light source thereinside, the reflector irradiating a radial light beam from the light source after aligning in a predetermine direction; a light-transmissive component that covers a light-irradiation side of the reflector; a light source housing that houses the light source, the reflector and the light-transmissive component, in which an opening that introduces a cooling air to the light source is formed on the reflector, and the light source housing has a cooling-air-introducing opening formed at a position corresponding to the position of the opening of the reflector and a duct that protrudes from the light source housing to be connected with a discharge hole of the fan when the duct is attached to the optical equipment.

According to the above arrangement, since the duct provided on the light source housing protrudes from the light source housing when the light source housing is attached to the optical equipment to be connected with the discharge hole of the fan that transfers a cooling air, the cooling air transferred by the fan can be introduced into the light source housing, i.e. into the reflector. Accordingly, approximately the entire cooling air supplied from the discharge hole of the fan can be transferred into the reflector so that the light source lamp can be sufficiently cooled.

In the above aspect of the present invention, the duct may preferably also work as a shutter that closes the opening formed on the light source housing.

According to the above arrangement, when the light source lamp housed within the light source hosing is damaged, the opening can be closed by the duct to close the light source housing. Therefore, no additional shutter component is necessary for preventing the broken pieces of the light source lamp from being scattered when the light source housing is detached. Accordingly, the number of components can be reduced and the internal structure can be simplified.

In the above aspect of the present invention, the light source housing may preferably have a positioning surface that locates the reflector in a direction of the light beam irradiated by the reflector, and the duct may preferably be slidably attached to a surface of the light source housing intersecting the positioning surface.

According to the above arrangement, the light source can be further efficiently cooled on account of the following reasons. The reflector is enlarged at the distal end of the light-irradiation side and the light source housing ordinarily touches the reflector at the distal end. By providing the duct around the distal side, the distance between the duct and the opening formed on the reflector can be shortened. Accordingly, the channel for circulating the cooling air can be shortened and the cooling air can be supplied to the inside of the reflector without losing the pressure thereof. Therefore, the light source lamp can be securely cooled.

A projector according to another aspect of the present invention has: a light source; an optical modulator that modulates a light beam irradiated by the light source in accordance with image information to form an optical image; a projection optical system that enlarges and projects the optical image; a fan that cools the light source; and the above-described light source device.

According to the above arrangement, approximately the same functions and advantages as the above-described light source device can be obtained. Further, since the cooling air for cooling the light source lamp is supplied by the fan provided in the projector as a component independent of the light source device, the light source can be securely cooled.

In the above aspect of the present invention, a casing that houses an apparatus body including the optical modulator thereinside may preferably be provided, the casing having an opening from which the light source device is attached and detached, where a lid component that closes the opening may preferably be attached to the opening, and the duct of the light source device may preferably protrude when the lid component is attached.

In the above arrangement, the lid component may preferably be attached by sliding along a side of the casing, and a projection that engages with the duct and protrudes the duct relative to the light source housing may preferably be formed on an inner surface of the lid component.

According to the above arrangement, the duct of the light source device can be protruded by attaching the lid component that closes the opening on the casing for housing the light source device. Accordingly, when the projector is used, the duct can be securely connected with the fan and the light source device can be efficiently cooled.

Further, when the projection engaging with the duct is formed on the lid component, the duct can be connected with the discharge hole of the fan when the lid component is attached to the casing. Accordingly, no additional component is required for protruding the duct, so that the structure can be simplified and the size of the light source device and the casing can be reduced.

DETAILED DESCRIPTION OF PREFERRED EMBODIMENT(S)

An embodiment of the present invention will be described below with reference to the attached drawings.

1. Primary Arrangement of Projector

Figure 1:
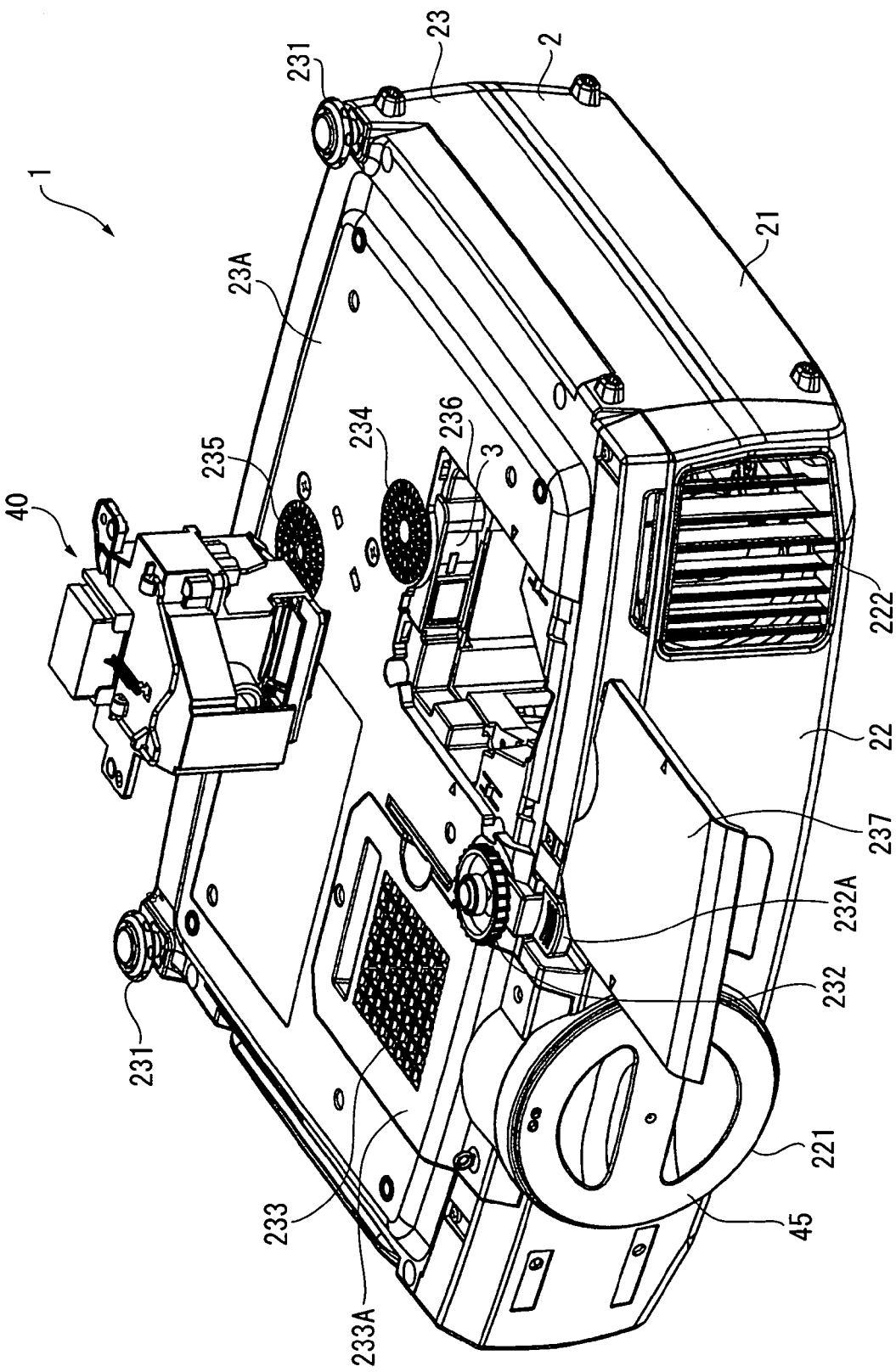
FIG. 1 is a perspective view showing a projector according to an embodiment of the present invention.

FIG. 1 is a perspective view showing a lower front side of a projector provided with a light source device according to an embodiment of the present invention.

A body 1 of the projector has an exterior case 2 (casing) covering the body 1. The exterior case 2 is formed in an approximately rectangular parallelepiped having greater dimension in width direction orthogonal to a light-projecting direction of the below-described projection lens 45 than in the light-projecting direction.

The exterior case 2 has an upper case 21, a front case 22 and a lower case 23. The upper case 21 forms the upper side, the lateral sides and the rear side of the body 1. The front case 22 forms the front side of the body 1. The lower case 23 forms the bottom side, the lateral sides and the rear side of the body 1. The respective cases 21 to 23 are integrally-molded synthetic resin article made by injection molding etc, which may alternatively be made of metal.

The upper case 21 has an upper section, lateral sections extending substantially vertically downward from both ends in the width direction of the upper section, and a rear section extending substantially vertically downward from the rear end of the upper section.

Though not illustrated, a notch for exposing a projection lens 45 for projecting the optical image formed by an optical unit 4, and an operation panel provided with switches for on/off operation of a power supply, zooming operation of the projection image and the like are provided on the upper section.

An opening 221 is formed on the front case 22 at a position corresponding to the projection lens 45. A slitted exhaust port 222 for exhausting the air circulated inside the body 1 to the outside is formed on a side opposite to the opening 221.

The lower case 23 is arranged approximately symmetrically centering the surface engaged with the upper case 21, which includes a bottom section, lateral sections bent approximately upward from the ends in width direction and a rear section bent approximately upward from the rear edge of the bottom section. The upper edges of the lateral sections and the rear section thereof engage with the lower edges of the lateral sections and the rear section of the upper case 21 to define the lateral portion and the rear portion of the exterior case 2.

Two fixed legs 231 and an adjustment leg 232 are attached to the bottom section of the lower case 23. The fixed legs 231 are provided on both ends of the rear side of the bottom section. The adjustment leg 232 is provided approximately at the front center of the bottom section. The adjustment leg 232 includes a shaft component capable of advancement and retraction from the bottom section in an out-plane direction, of which advancement and retraction amount from the bottom section can be adjusted by manipulating an adjustment button 232A provided on the front side of the adjustment leg 232. Accordingly, the vertical position of the projected image irradiated by the body 1 can be adjusted to form the projected image at an appropriate position.

Intakes 233 to 235 for drawing in the air for cooling the components inside the body 1 from the outside of the body 1 are formed on the bottom section.

The intake 233 is provided at a position corresponding to the projection lens 45. Though not illustrated, a pair of fans oppositely disposed sandwiching the projection lens 45 and a duct for intercommunicating the suction sides of the pair of fans with the intake 233 are provided inside the lower case 23. The cooling air drawn in by the fan from the intake 233 through the duct cools the optical device of the optical unit 4 including liquid crystal panels, a cross dichroic prism, polarization plates and the like. A slitted cover 233A is provided on the opening of the intake 233.

The intake 234 is formed approximately at the center of the bottom section, i.e. at a position corresponding to a fan 3 for transferring the cooling air to the light source device 40.

The intake 235 is formed approximately at the center on the rear side of the bottom section. A fan (not shown) is provided at the position of the intake 235 inside the body 1.

The air introduced by the fan through the intake 235 cools a power supply unit (not shown). The intakes 234 and 235 are slitted openings.

The cooling air introduced to the inside of the body 1 through the intakes 233 to 235 cools the components inside the body 1 and, subsequently, is discharged from the exhaust port 222 formed on the front case 22 to the outside of the body 1. Incidentally, dust-proof filters for preventing invasion of dust etc. toward the inside of the body 1 are provided inside the intakes 233 to 235.

An opening 236 is formed approximately at the center of the front side of the bottom section. The opening 236 is an opening from which the below-described light source 40 is installed inside the body 1. A lid component 237 capable of being attached and detached by slide movement in the light-irradiating direction of the projection lens 45 is provided on the opening 236.

(2) Internal Arrangement

Figure 2:
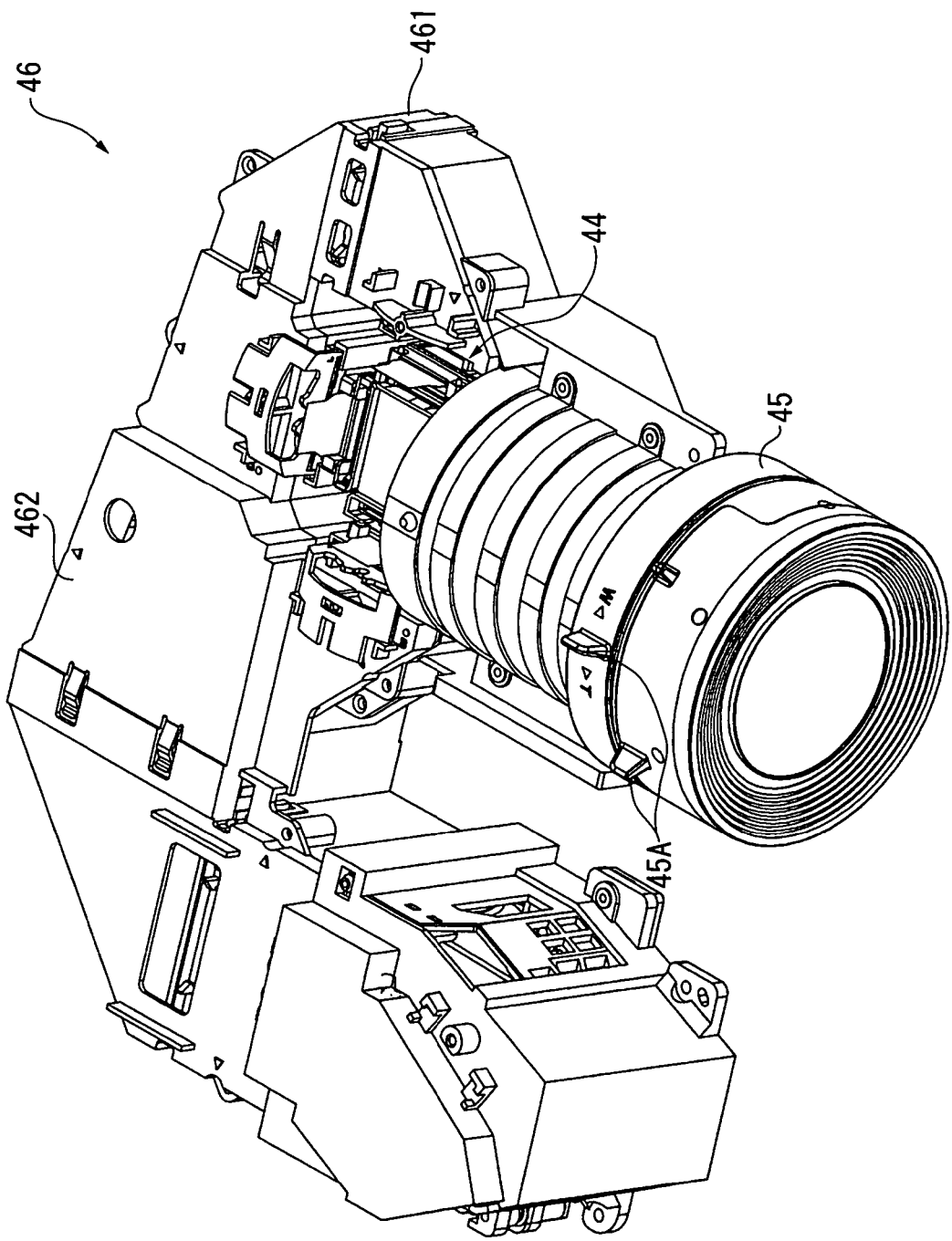
FIG. 2 is an illustration showing a light guide of the aforesaid embodiment.

FIG. 2 is a perspective view showing an arrangement of a light guide 46 of the optical unit 4.

The light guide 46 is an approximately planarly-viewed U-shaped optical component casing for housing the optical unit 4. The light guide 46 is made of synthetic resin and is constructed of a lower light guide 461 and an upper light guide 462.

Grooves (not illustrated) for slidably fitting the respective optical systems of the optical unit 4 from the above are provided on the lower light guide 461.

The upper light guide 462 is a lid-shaped component for closing the upper opening of the lower light guide 461.

An optical device 44 is fixed on an end of the light guide 46 and the projection lens 45 is fixed on the downstream of the optical device 44. The light source device 40 is housed on the other end of the light guide 46. Incidentally, the bottom portion (not shown) of the lower light guide 461 is opened at the position where the light source device 40 is housed, which corresponds to the position of the opening 236 formed on the lower case 23. Accordingly, the light source device 40 is detachable from and attachable to the lower light guide 461 through the opening 236.

Figure 3:
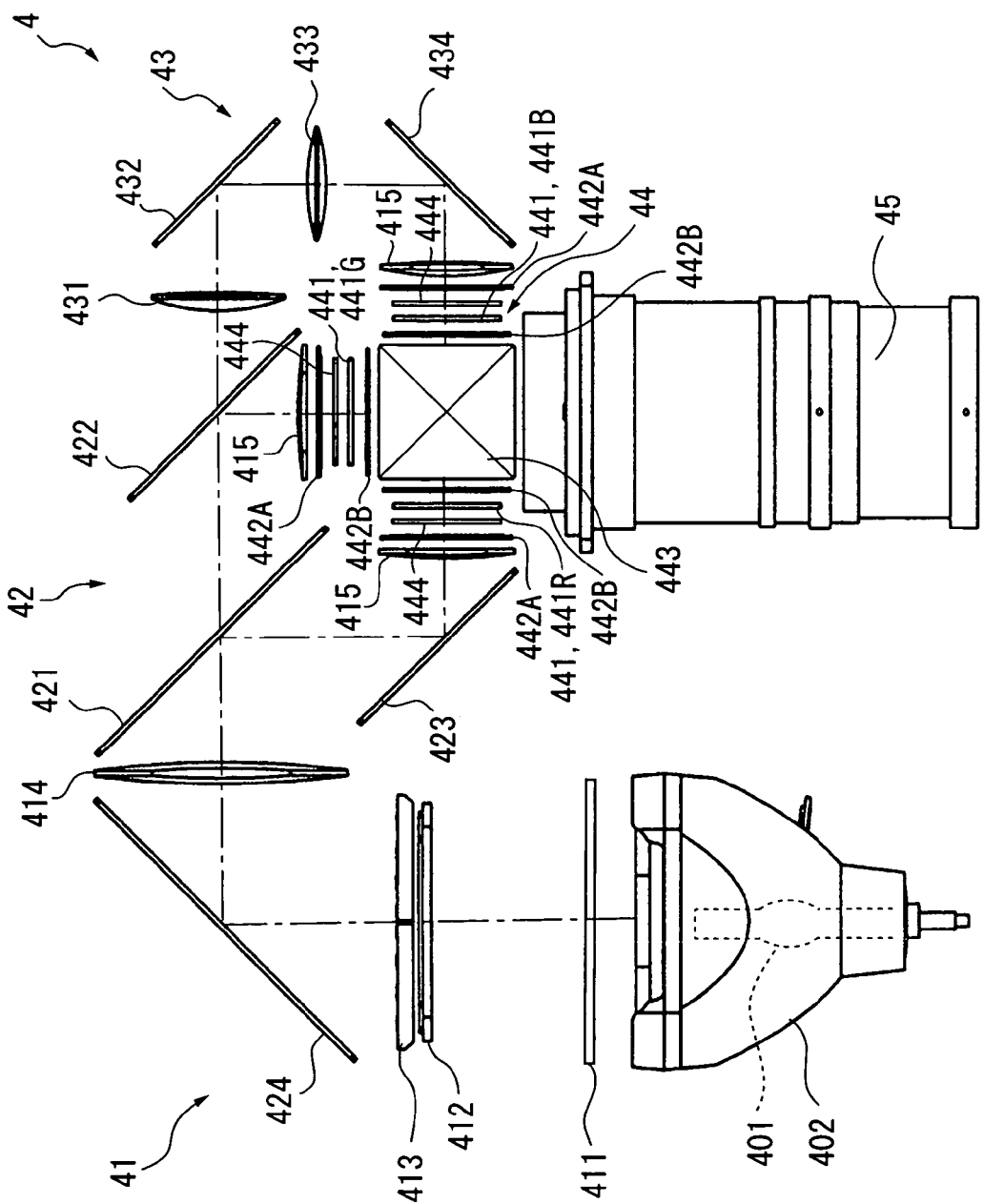
FIG. 3 is a schematic illustration showing an optical system of an optical unit of the aforesaid embodiment.

FIG. 3 is a schematic illustration showing the optical system of the optical unit 4.

The optical unit 4 (optical engine) is a unit that optically processes the light beam irradiated by the light source to form an optical image in accordance with image information and enlarges and projects the optical image.

The optical unit 4 includes the light source device 40 having a light source lamp 401 and a reflector 402, an integrator illuminating optical system 41, a color-separating optical system 42, a relay optical system 43, the optical device 44, the projection lens 45 (projection optical device), and the light guide 46 (FIG. 2) as an optical component casing made of synthetic resin, the light guide 46 housing the optical components 41 to 45. Incidentally, the optical unit 4 of the present embodiment is a three-plate prism type, which is arranged as a spatial color-separating unit for separating the white light irradiated by the light source into three colors. The detailed structure of the light source device 40 will be described below.

The radial light beam irradiated by the light source lamp 401 (radial light source) is reflected by the reflector 402 to be irradiated onto a first lens array 411 of the integrator illuminating optical system 41 as an approximately parallel light beam. Halogen lamp, metal halide lamp and high-pressure mercury lamp are often used as the light source lamp 401.

A parabolic mirror is used for the reflector 402. A combination of an ellipsoidal mirror and a parallelizing lens (concave lens) may be used instead of the parabolic mirror.

The integrator illuminating optical system 41 is an optical system for substantially uniformly illuminating the image formation areas of the three liquid crystal panels 441 (referred to as liquid crystal panels 441R, 441G and 441B for each color light of red, blue and green). The integrator illuminating optical system 41 has the first lens array 411, a second lens array 412, a polarization converter 413, a superposing lens 414 and a field lens 415.

The first lens array 411 has small lenses arranged in a matrix, the lenses having substantially rectangular profile seen in the illumination optical axis direction. The profile of the respective small lenses is arranged to be approximately similar to the profile of the below-described image formation area of the liquid crystal panels 441. The small lenses of the first lens array 411 separates the incident light beam into sub-beams and irradiates the sub-beams in the illumination optical axis direction, i.e. toward the polarization converter 413, through the second lens array 412.

The second lens array 412 is arranged approximately in the same manner as the first lens array 411, which includes small lenses arranged in a matrix together with the superposing lens 414. The second lens array 412 focuses the image of the small lenses of the first lens array 411 onto the liquid crystal panel 441.

The polarization converter 413 is disposed between the second lens array 412 and the superposing lens 414. The polarization converter 413 converts the light from the second lens array 412 into substantially uniform polarized light, thereby enhancing the light utilization efficiency of the optical device 44.

Specifically, the respective sub-beams converted into substantially uniform polarized light by the polarization converter 413 is substantially superposed on the below-described liquid crystal panels 441R, 441G and 441B of the optical device 44 by the superposing lens 414. Since only one-type of polarized light can be used in a projector (optical device 44) using the liquid crystal panels 441 that modulate a polarized light, approximately half of the light beam from the light source lamp 401 emitting random polarized light cannot be used. Accordingly, with the use of the polarization converter 413, the light beam irradiated by the light source lamp 401 is converted into substantially uniform polarized light to enhance the light utilization efficiency of the optical device 44. Incidentally, such polarization converter 414 is disclosed in, for instance, Japanese Patent Laid-Open Publication No. H08-304739.

The respective sub-beams converted into approximately uniform polarized light are, in the end, focused on the liquid crystal panel 441 of the below-described optical device 44 through the color-separating optical system 42 by the superposing lens 414 (and the relay optical system 43).

The field lens 415 is provided between the superposing lens 414 and the incident-side polarization plate 442A. The field lens 415 converts the respective sub-beams irradiated by the second lens array 412 into a light beam parallel to the main beam.

The color-separating optical system 42 has two dichroic mirrors 421 and 422, and two reflection mirrors 423 and 424, which separates the plurality of sub-beams irradiated by the integrator illuminating optical system 41 by the dichroic mirrors 421 and 422 into three color lights of red (R), green (G) and blue (B).

The dichroic mirror 421 transmits the blue light component and green light component of the light beam irradiated by the integrator illuminating optical system 41 and reflects the red light component. The red light reflected by the dichroic mirror 421 is reflected by the reflection mirror 423, which reaches to the liquid crystal panel 441R for red color through the field lens 415.

In the blue and green lights transmitted through the dichroic mirror 421, the green light is reflected by the dichroic mirror 422, which reaches to the liquid crystal panel 441G for green light through the field lens 415. On the other hand, the blue light is transmitted through the dichroic mirror 422, which passes through the relay optical system 43 to reach to the liquid crystal panel 441B for blue light through the field lens 415.

The relay optical system 43 has an incident-side lens 431, a relay lens 433 and two reflection mirrors 432 and 434, which guides the color light (blue light) separated by the color-separating optical system 42 toward the liquid crystal panel 441B. Incidentally, the relay optical system 43 is used for the blue light in order to avoid deterioration in the light utilization efficiency on account of light dispersion and the like caused by the longer length of the optical path of the blue light than the optical path of the other color lights. In other words, the relay optical system 43 is used for directly transmitting the sub-beams incident on the incident-side lens 431 to the field lens 415. Incidentally, though the blue light of the three color lights passes through the relay optical system 43, the red light, for instance, may alternatively pass through the relay optical system 43.

The optical device 44 modulates the respective color lights separated by the color-separating optical system 42 using the liquid crystal panel 441 in accordance with image information.

The optical device 44 has incident-side polarization plates 442A, visual-angle corrector plates 444, the liquid crystal panels 441 (optical modulators) and irradiation-side polarization plates 442B provided for respective color lights and arranged in the order of the advancement direction of the light beam, and a cross dichroic prism 443. The liquid crystal panel 441 includes the liquid crystal panels 441R, 441G and 441B for the respective color lights (red (R), green (G) and blue (B)).

The incident-side polarization plate 442 transmits a polarized light in a predetermined direction out of the respective color lights separated by the color-separating optical system 42 and absorbs the other light beam, which has a substrate made of sapphire glass and the like attached with a polarization film. Alternatively, a polarization film may be attached on the field lens 415 without using a substrate.

The visual-angle corrector plate 444 has a substrate on which an optical conversion film is formed, the optical conversion film correcting the visual field angle of the optical image formed by the liquid crystal panels 441R, 441G and 441B. By providing the visual-angle corrector plate 444, the light obliquely incident on the liquid crystal panel 441 can be corrected, so that the light leakage on a black screen can be diminished and the contrast of the projected image can be greatly improved.

The liquid crystal panels 441R, 441G and 441B use, for instance, a polycrystalline silicon TFT as a switching element, which has, though not shown, a pair of opposing transparent substrates with liquid crystal sealed therebetween. The respective color lights separated by the color-separating optical system 42 are modulated by the three liquid crystal panels 441R, 441G and 441B and the polarization plates 442 provided on the light-incident and light-irradiation sides thereof in accordance with image information to form an optical image.

The irradiation-side polarization plates 442B are arranged approximately in the same manner as the incident-side polarization plates 442A, which transmits the polarized light in a predetermined direction out of the light beam irradiated by the liquid crystal panel 441 (441R, 441G and 441B) and absorbs the other light beam. Alternatively, a polarization film may be attached on the cross dichroic prism 443 without using a substrate.

Incidentally, the incident-side polarization plates 442A and the irradiation-side polarization plates 442B are arranged so that the polarization axes thereof extend mutually orthogonal.

The cross dichroic prism 443 combines the image modulated for the respective color lights irradiated by the three liquid crystal panels 441R, 441G and 441B through the irradiation-side polarization plates 442B to form a color image. Incidentally, a dielectric multi-layer film reflecting red light and another dielectric multi-layer film reflecting blue light are arranged on the cross dichroic prism 443 along the boundaries of four right-angle prisms approximately in an X-shape. The dielectric multi-layer films combines the three color lights to form a color image.

The projection lens 45 is a lens set combining a plurality of lenses, which enlarges and projects the color image combined by the cross dichroic prism 443 on a screen. The projection lens 45 is provided with a lever 45A (see FIG. 2) for changing the relative position of the plurality of lenses, so that the focus and magnification of the projected color image can be adjusted. Though not illustrated, the lever 45A is exposed at the notch of the upper case 21 so that the lever 45A can be manipulated from the outside of the body 1.

Figure 4:
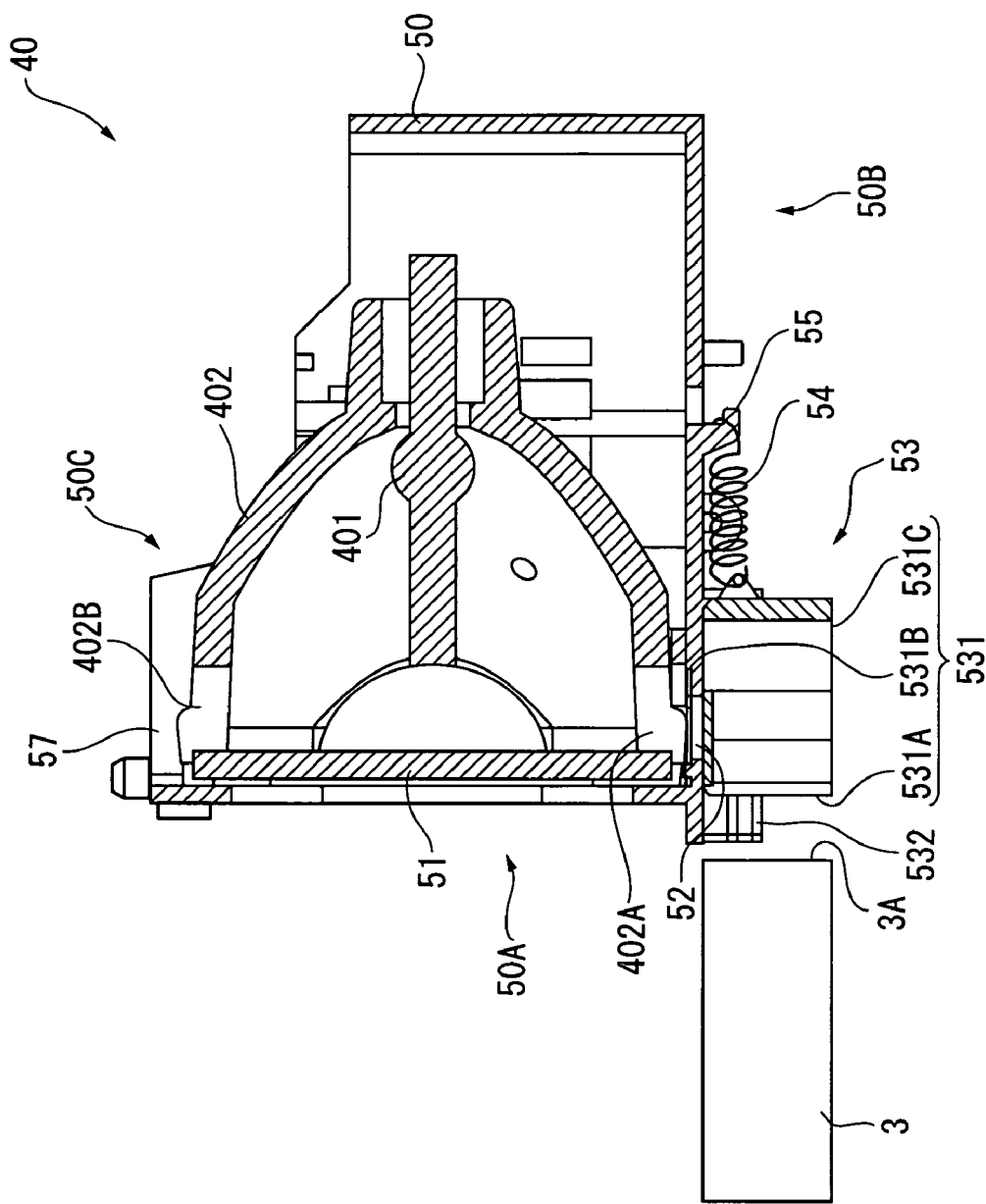
FIG. 4 is a cross section showing a light source device of the aforesaid embodiment.
Figure 5:
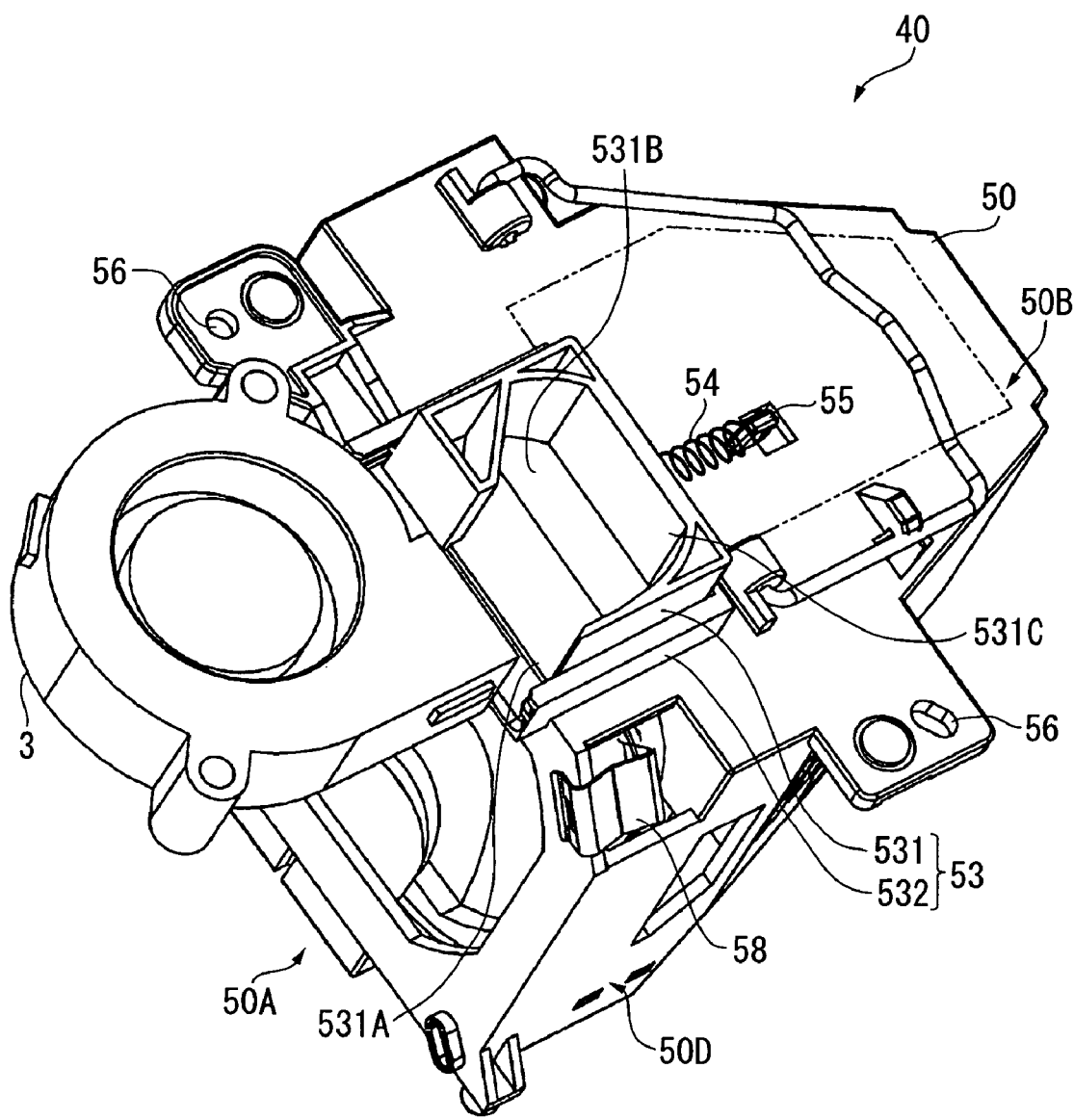
FIG. 5 is a perspective view showing the light source device of the aforesaid embodiment.

FIGS. 4 and 5 are cross section and perspective view showing the light source device 40 when an intake is closed.

As shown in FIG. 4, the light source device 40 inserted from the opening 236 of the above-described lower case 23 and attached to the light guide 46 has the light source lamp 401, the reflector 402 and a lamp housing 50 (light source housing) for housing the light source lamp and the reflector therein. The reflector 402 has an opening 402A for introducing a cooling air that cools the light source lamp 401 and another opening 402B for discharging the cooling air from the reflector 402. The openings 402A and 402B are symmetrically formed around the optical axis of the reflector 402. Incidentally, a light-transmissive component 51 is provided on the entirety of the light-irradiation side of the reflector 402. The light-transmissive component 51 is a glass component for preventing the broken pieces from scattering in the optical axis direction when the light source lamp 401 is damaged. Incidentally, though the glass light-transmissive component 51 is used in the present embodiment, transparent acryl resin may alternatively be used.

The fan 3 is provided on the body 1 as a component independent of the light source device 40, which transfers the cooling air for cooling the light source lamp 401. The fan 3 has a discharge hole 3A for transferring the cooling air at a position opposing to the light source device 40.

The lamp housing 50 is a synthetic resin box component having at least three sides of a front section 50A touching the reflector 402, lateral sections and a bottom section. The front section 50A opposes to the light beam irradiated by the reflector 402, which locates the reflector 402 in the optical axis direction in the lamp housing 50.

A bottom section 50B approximately vertically intersecting the edge of the front section 50A is opposed to the opening 402A of the reflector 402. An intake 52, a duct 53, a helical spring 54 and a projection 55 are formed on the bottom section 50B.

The intake 52 is formed at a position corresponding to the position of the opening 402A, which is an opening for introducing the cooling air transferred from the outside of the lamp housing 50 toward the inside of the reflector 402.

The duct 53 introduces the cooling air from the fan 3 into the lamp housing 50 and exposes the intake 52 of the lamp housing 50. The duct 53 includes a duct body 531 covering the intake 52, and guides 532 provided on both sides of the duct body 531 to guide the slide movement of the duct body 531.

The duct body 531 has an approximately parallelepiped configuration having an opening on the side of the front section 50A and on a side parallel to the bottom section 50B with a part of the side in contact with the bottom section 50B on the front section 50A side being closed (see FIG. 5).

The connector hole 531A formed on the front section 50A is opened opposing to the discharge hole 3A of the fan 3. In other words, the connector hole 531A is connected with the discharge hole 3A by the slide movement of the duct body 531 to introduce the cooling air to the duct body 531.

The introduction hole 531B formed on the side in contact with the bottom section 50B is an opening formed at a position opposing to the intake 52 when the connector hole 531A is connected with the discharge hole 3A. In other words, when the connector hole 531A is connected with the discharge hole 3A, the positions of the introduction hole 531B and the intake 52 are coincided to open the intake 52.

The opening formed on the side opposing to the bottom section 50B is covered with a sheet 531C.

The helical spring 54 has an end connected to an end opposite to the connector hole 531A of the duct body 531. The other end of the helical spring 54 is connected with the projection 55. The projection 55 is protruded on an extension of the line connecting the discharge hole 3A of fan 3 and the duct body 531 on the bottom section 50B of the lamp housing 50.

According to the above arrangement, the duct body 531 is biased in a direction away from the front section 50A of the lamp housing 50, i.e. in a direction for closing the intake 52.

An open/close lid 57 for closing the opening 402B of the reflector 402 is provided on a top section 50C opposing to the bottom section 50B. The open/close lid 57 opens the opening 402B being engaged with a projection (not shown) provided on the light guide 46 when the light source device 40 is attached to the light guide 46. When the light source device 40 is detached from the light guide 46, the engagement of the open/close lid 57 is released and the opening 402B is closed by the open/close lid 57.

As shown in FIG. 5, a plurality of holes 56 are formed on the bottom section 50B of the lamp housing 50. The holes 56 receives a positioning boss from the light guide 46 (not illustrated) when the light source device 40 is attached to the light guide 46.

Attachments 58 such as a clip for fixing the reflector 402 on the lamp housing 50 are respectively provided on lateral sections 50D and 50E on the side intersecting the front section 50A of the lamp housing 50 and intersecting the bottom section 50B.

Figure 6:
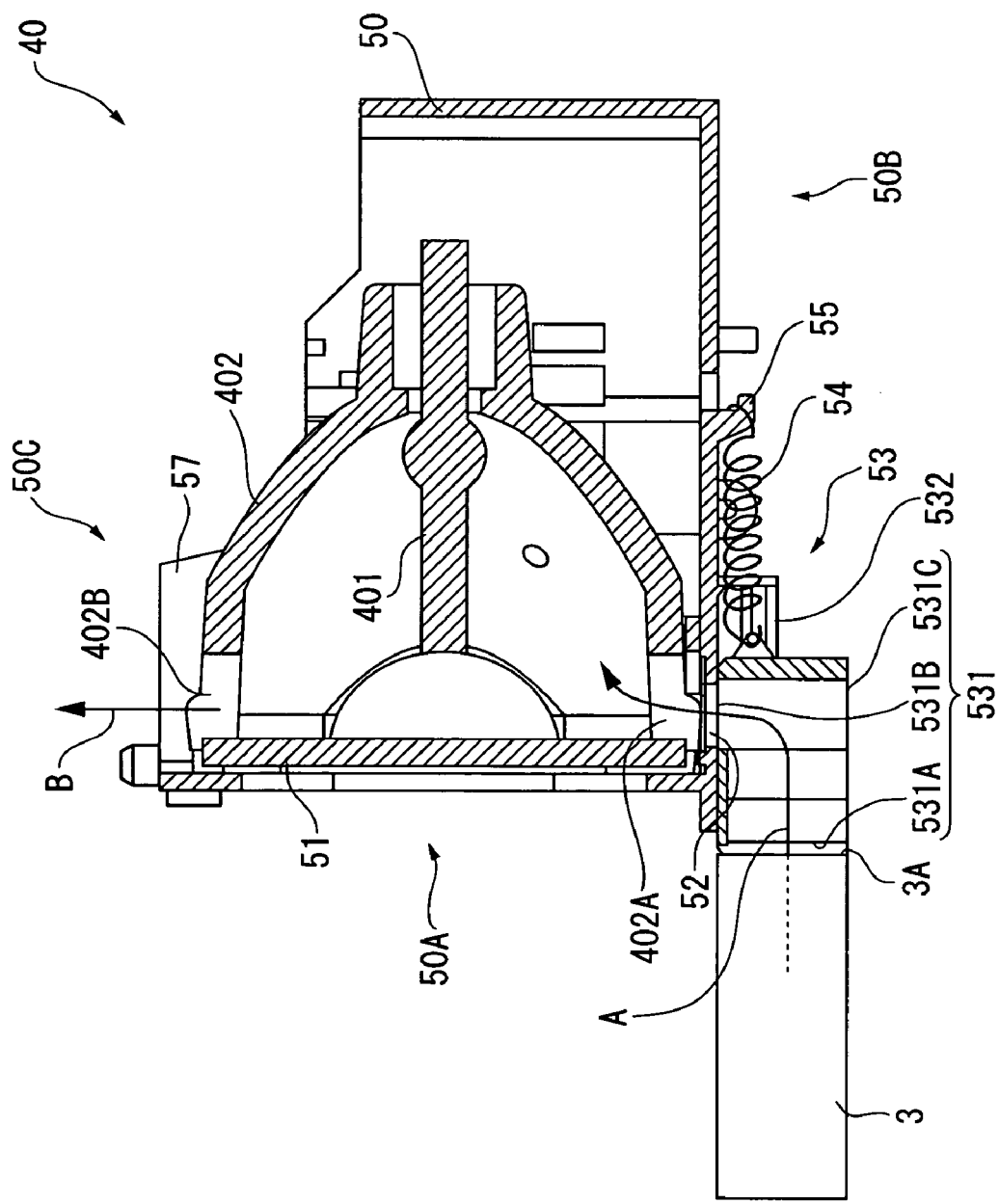
FIG. 6 is another cross section showing the light source device of the aforesaid embodiment.
Figure 7:
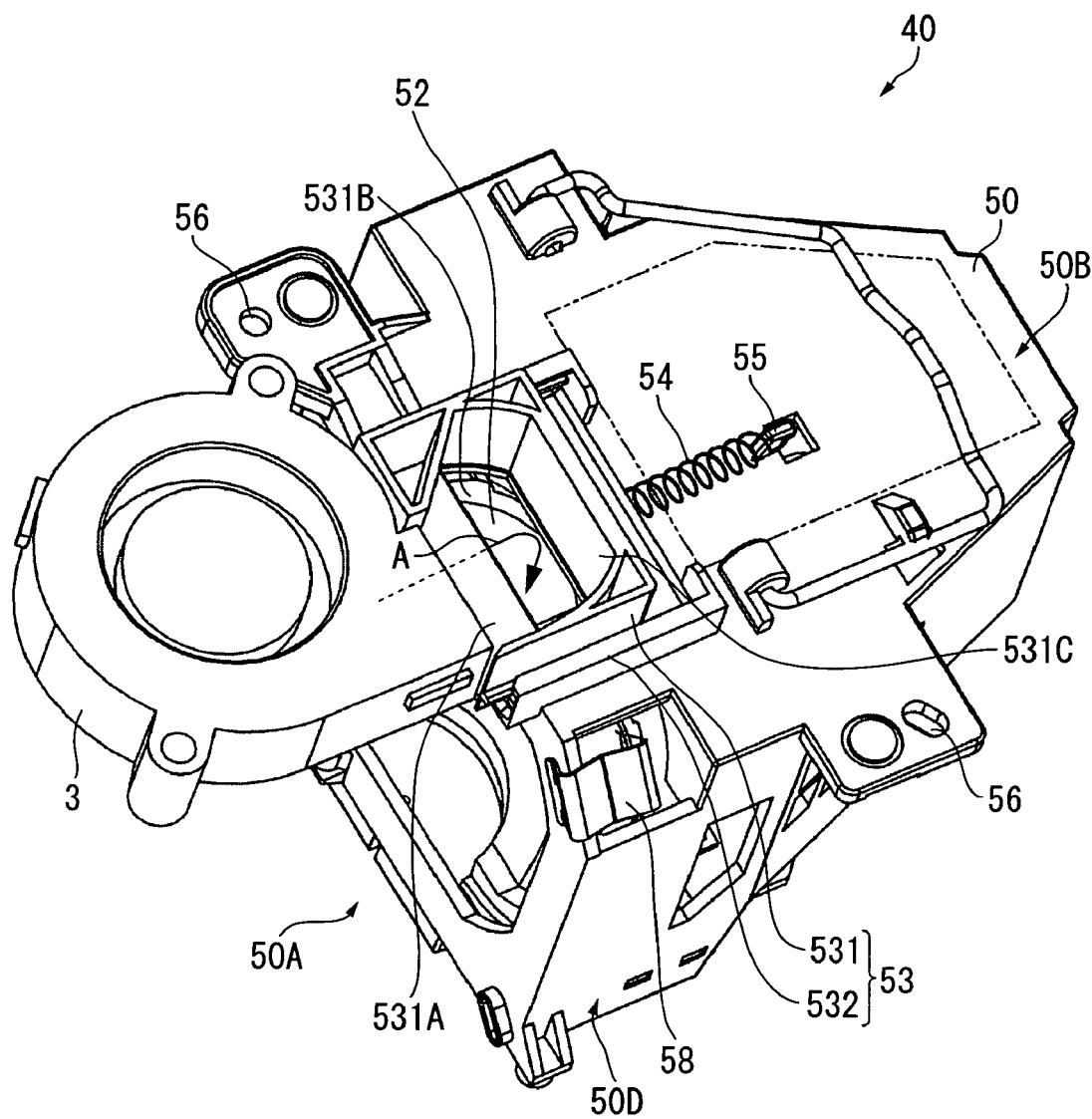
FIG. 7 is another perspective view showing the light source device of the aforesaid embodiment.

FIGS. 6 and 7 are cross section and perspective view showing the light source device 40 when the intake is opened. A mechanism for cooling the light source lamp 401 by the cooling air transferred by the fan 3 will be described below with reference to FIGS. 4 to 7.

When the light source device 40 shown in FIGS. 4 and 5 are attached to the light guide 46, the open/close lid 57 provided on the top section 50C of the lamp housing 50 opens the opening 402B. In this state, when the duct body 531 provided on the bottom section 50B of the lamp housing 50 is slid to protrude toward the front section 50A against the biasing force of the helical spring 54, the connector hole 531A of the duct body 531 is connected to the discharge hole 3A of the fan 3 as shown in FIGS. 6 and 7. In accordance with the slide movement, the position of the introduction hole 531B of the duct body 531 is coincided with the intake 52 of the lamp housing 50 to open the intake 52. The cooling air transferred by the discharge hole 3A of the fan 3 is transferred from the connected connector hole 531A to the inside of the duct body 531 substantially without being leaked to the outside, which enters into the reflector 402 through the opened intake 52 and the opening 402A (see arrow A in FIGS. 6 and 7). The cooling air introduced into the reflector 402 cools the light source lamp 401 located approximately at the center of the reflector 402. The air having cooled the light source lamp 401 is exhausted to the outside of the lamp housing 50 through the opening 402B by the air transfer pressure of the fan 3 (see arrow B in FIG. 6).

Figure 8:
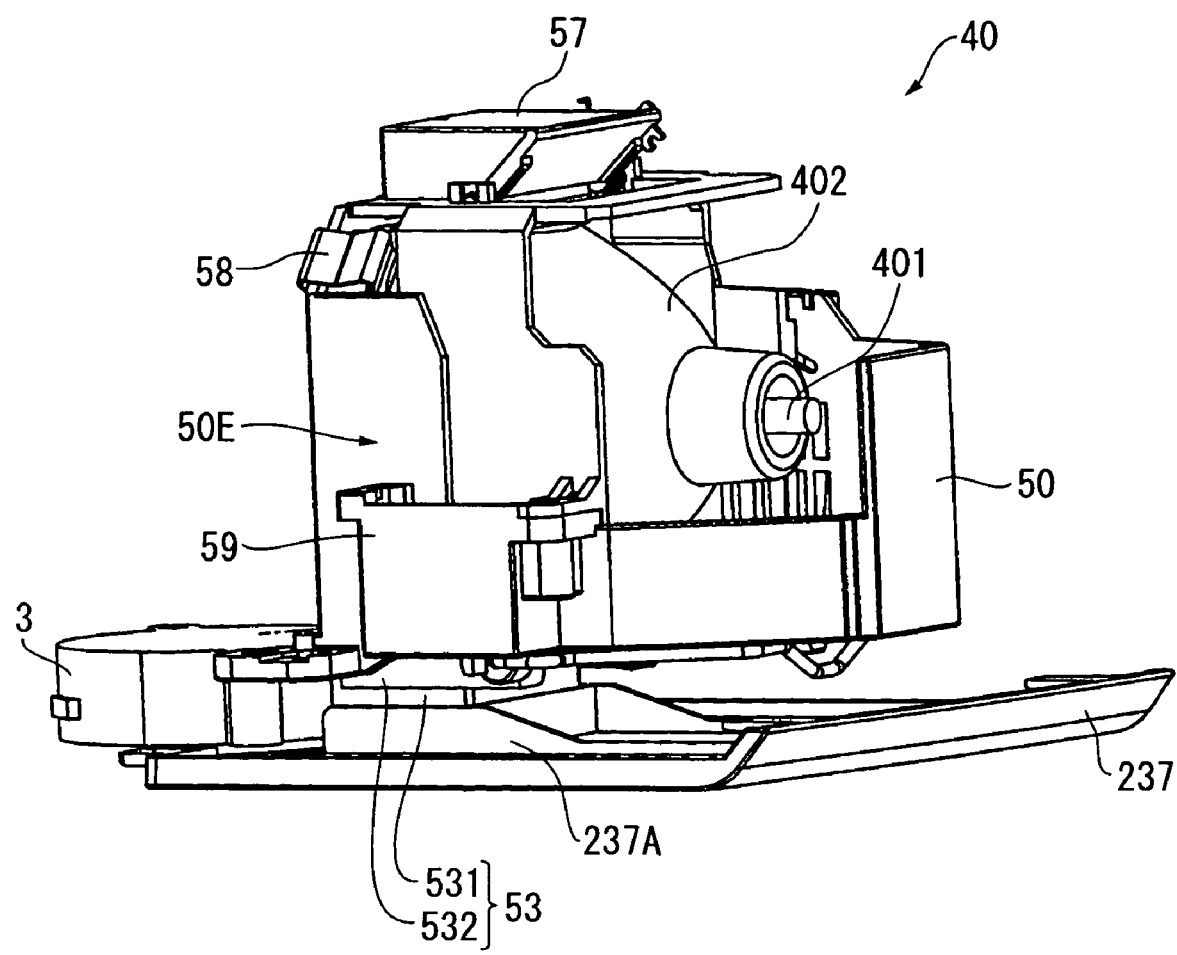
FIG. 8 is a perspective view showing the light source device and a lid component of the aforesaid embodiment.

FIG. 8 is a perspective view showing an arrangement of the light source device 40 and the lid component 237.

A projection 237A is formed approximately at the center of the inside of the lid component 237. The projection 237A is formed at a position corresponding to the position where the duct body 531 of the lamp housing 50 protrudes toward the front section 50A to be connected with the discharge hole 3A of the fan 3 when the lid component 237 is attached to the lower case 23. The projection 237A is engaged with the surface on which the duct body 531 is connected with the helical spring 54 when the lid component 237 is attached to the lower case 23. In other words, the projection 237A is engaged with the duct body 531 to slide the duct body 531 toward the front section 50A against the biasing force of the helical spring 54 when the lid component 237 is attached to the lower case 23. Accordingly, the connector hole 531A of the duct body 531 is connected with the discharge hole 3A of the fan 3.

Incidentally, a connector 59 is provided on the lateral section 50E of the lamp housing 50. The connector 59 is electrically connected with a connector (not shown) provided on the light guide 46 when the light source device 40 is attached to the light guide 46. Accordingly, the electric power is supplied to the light source lamp 401.

Figure 9:
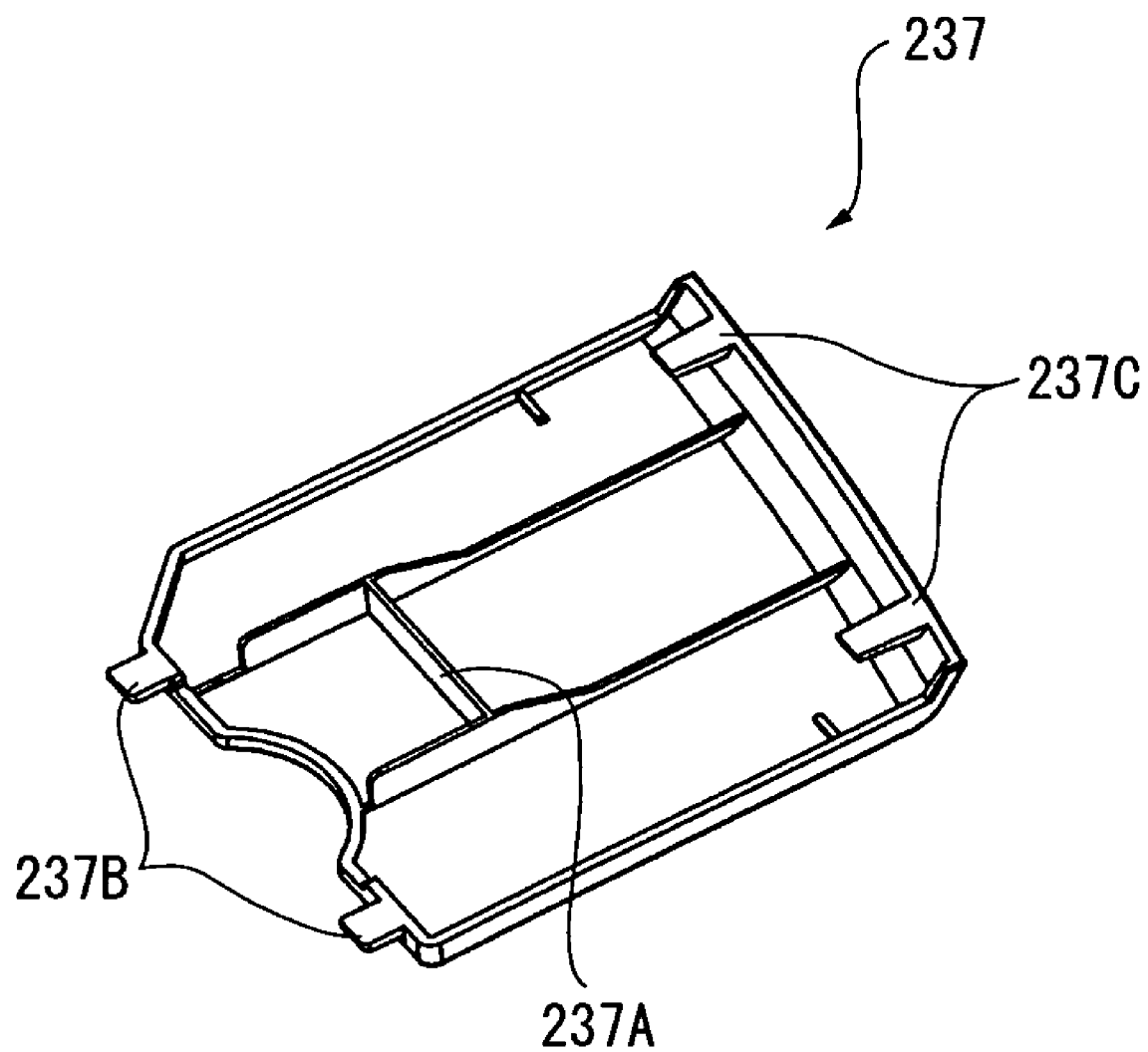
FIG. 9 is a perspective view showing the lid component of the aforesaid embodiment.

FIG. 9 is a perspective view showing the lid component 237.

The projection 237A having approximately C-shaped configuration is formed on the inner surface of the lid component 237.

Projections 237B and 237C are formed on both ends in the slide direction of the lid component 237. The projections 237B and 237C protrude in a direction for the lid component to be fitted to the lower case 23, so that the projections 237B and 237C are fitted to the lower case 23 to fix the lid component 237 on the lower case 23.

The attachment process of the lid component 237 to the lower case 23 and the slide movement of the duct body 531 of the lamp housing 50 will be described below.

The lid component 237 slides along the bottom section 23A of the lower case 23 to be attached to the lower case 23. When the lid component 237 is attached, in attaching the light source device 40 to the light guide 46, the duct body 531 and the projection 237A of the lid component 237 are engaged. When the lid component 237 is further moved, the duct body 531 engaged with the projection 237A slides toward the fan 3 against the biasing force of the helical spring 54 to protrude relative to the front section 50A. When the lid component 237 is fitted to the lower case 23, the connector hole 531A of the duct body 531 is connected with the discharge hole 3A of the fan 3 to open the intake 52 of the lamp housing 50.

On the other hand, when the lid component 237 is slid in a direction to be detached from the lower case 23, the engagement between the projection 237A of the lid component 237 and the duct body 531 is released. Accordingly, on account of the biasing force of the helical spring 54, the duct body 531 moves in a direction to be away from the front section 50A, in other words, in a direction to be away from the discharge hole 3A of the fan 3 to close the intake 52 of the lamp housing 50.

(3) Advantages of Embodiment

According to the above-described embodiment, following advantages can be obtained.

(1) When the lamp housing 50 is attached to the light guide 46, the duct 53 provided on the lamp housing 50 slides to protrude toward the front section 50A of the lamp housing 50 to be connected with the discharge hole 3A of the fan 3 that transfers the cooling air. Accordingly, the cooling air transferred by the fan 3 can be efficiently introduced into the lamp housing 50, i.e. into the reflector 402. Therefore, almost entire cooling air supplied through the discharge hole 3A of the fan 3 can be supplied to the opening 402B of the reflector 402 and the light source lamp 401 and the reflector 402 can be sufficiently cooled.

(2) The duct 53 also works as a shutter for closing the intake 52 to close the lamp housing 50 when the light source lamp 401 housed in the lamp housing 50 is damaged. Therefore, no additional shutter component is necessary for preventing the broken pieces of the light source lamp 401 from being scattered when the lamp housing 50 is detached. Accordingly, the number of the components of the lamp housing 50 can be reduced and the internal structure thereof can be simplified.

(3) By providing the duct 53 at the distal side of the light-irradiation side of the reflector 420, the distance between the intake 52 formed by the duct 53 and the opening 402A formed on the reflector 402 can be shortened. Further, the flow path of the cooling air circulating in the duct 53 can also be shortened. Accordingly, the cooling air from the fan 3 can be supplied into the reflector 402 without losing the pressure thereof. Therefore, the light source lamp 401 can be securely cooled.

(4) Since the above-described light source device 40 is used in the projector of the present embodiment, the cooling air supplied from the fan provided inside the body 1 as a component independent of the light source device 40 can be used for cooling the light source lamp without substantial loss. Further, since the flow path of the cooling air can be shortened, the cooling air from the fan 3 can be securely introduced into the reflector 402. Accordingly, the cooling efficiency of the light source lamp 401 can be improved.

(5) Since the light source device 40 is attached to the light guide 46 from the opening 236 on the lower case 23 and the duct 53 provided on the lamp housing 50 can be protruded by closing the opening 237 by the lid component 237. Accordingly, the duct 53 and the fan 3 can be securely connected when the projector of the present embodiment is used. Therefore, the light source lamp 401 of the light source device 40 can be effectively cooled.

(6) Since the projection 237A to be engaged with the duct body 531 of the lamp housing 50 is formed on the lid component 237, when the lid component 237 is attached to the lower case 23, the connector hole 531A of the duct 53 can be connected to the discharge hole 3A of the fan 3. Accordingly, no additional component is required for protruding the duct 53 to intercommunicate the fan 3 with the duct 53. Therefore, the internal structure of the body 1 can be simplified and the size of the light source device 40 and the exterior case 2 can be reduced.

(4) Modifications of Embodiment

Incidentally, the scope of the present invention is not restricted to the above-described embodiments, but includes modifications and improvements as long as an object of the present invention can be achieved.

Though a projector is taken as an example of the optical equipments in the above embodiment, the present invention can be applied to the other optical equipments using a light source.

Though the helical spring 54 is used for the lamp housing 50 to apply the biasing force to the duct 53 in the above embodiment, rubber and the like may alternatively be used.

Though the duct 53 and the discharge hole 3A of the fan are opposed in the above embodiment, the duct 53 may be arranged in an L-shape and the like when the duct 53 cannot be disposed in an opposed manner.

Though the lamp housing 50 has a box-shape in the above embodiment, the lamp housing 50 may be arranged in the other shape as long as the light source housing has a positioning surface of the reflector 402 and a surface that is provided with an intake 52 corresponding to the opening 402B.

Though a projector using three optical modulators are taken as an example in the above embodiment, the present invention may be applied to a projector using a single optical modulator, two optical modulators or more than three optical modulators.

Though a liquid crystal panel is used as the optical modulator in the above embodiment, an optical modulator other than the liquid crystal panel such as a device using a micro-mirror may be used.

Though a transmissive optical modulator having different light-incident side and light-irradiation side is used in the above embodiment, a reflective optical modulator having common light-incident side and light-irradiation side may be used.

Though a front-type projector that projects an image in a direction for observing a screen is taken as an example in the above embodiment, the present invention may be applied to a rear-type projector that projects an image in a direction opposite to the direction for observing the screen.

What is claimed is:

1. A light source device attached to an optical equipment provided with a light-source cooling fan thereinside, the light source device comprising:
   a light source;
   a reflector that has a concave curved reflection surface and houses the light source thereinside, the reflector irradiating a radial light beam from the light source after aligning in a predetermined direction;
   a light-transmissive component that covers a light-irradiation side of the reflector;
   a light source housing that houses the light source, the reflector and the light-transmissive component,
   wherein an opening that introduces a cooling air to the light source is formed on the reflector, and
   wherein the light source housing has a cooling-air-introducing opening formed at a position corresponding to the position of the opening of the reflector and a duct provided on the light source housing that slides to protrude from the light source housing and transfers the cooling air to the cooling-air introducing opening on the light source housing when the duct protrudes from the light source housing.

2. The light source device according to claim 1, wherein the duct also works as a shutter that closes the opening formed on the light source housing.

3. The light source device according to claim 2, wherein the light source housing has a positioning surface that locates the reflector in a direction of the light beam irradiated by the reflector, and
wherein the duct is slidably attached to a surface of the light source housing intersecting the positioning surface.

4. The light source device according to claim 1, wherein the light source housing has a positioning surface that locates the reflector in a direction of the light beam irradiated by the reflector, and
wherein the duct is slidably attached to a surface of the light source housing intersecting the positioning surface.

5. A projector, comprising: a light source; an optical modulator that modulates a light beam irradiated by the light source in accordance with image information to form an optical image; a projection optical system that enlarges and projects the optical image;
a fan that cools the light source; and
a light source device according to claim 1.

6. The projector according to claim 5, further comprising a casing that houses an apparatus body including the optical modulator thereinside, the casing having an opening from which the light source device is attached and detached,
wherein a lid component that closes the opening is attached to the opening, and
the duct of the light source device protrudes when the lid component is attached.

7. The projector according to claim 5, wherein the lid component is attached by sliding along a side of the casing, and
wherein a projection that engages with the duct to protrude the duct relative to the light source housing is formed on an inner surface of the lid component.

8. The projector according to claim 5, wherein the duct also works as a shutter that closes the opening formed on the light source housing.

9. The projector according to claim 8, wherein the light source housing has a positioning surface that locates the reflector in a direction of the light beam irradiated by the reflector, and
wherein the duct is slidably attached to a surface of the light source housing intersecting the positioning surface.

10. The projector according to claim 5, wherein the light source housing has a positioning surface that locates the reflector in a direction of the light beam irradiated by the reflector, and
wherein the duct is slidably attached to a surface of the light source housing intersecting the positioning surface.

* * * * *